United States Patent
Ramsey

(10) Patent No.: US 8,264,741 B2
(45) Date of Patent: Sep. 11, 2012

(54) COLOR TO BLACK ONLY PERCENT THRESHOLD OPTION FOR CUSTOMERS

(75) Inventor: Frederick John Ramsey, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 640 days.

(21) Appl. No.: 12/250,821

(22) Filed: Oct. 14, 2008

(65) Prior Publication Data

US 2010/0091306 A1   Apr. 15, 2010

(51) Int. Cl.
*H04N 1/40* (2006.01)
(52) U.S. Cl. .......... 358/1.9; 358/3.22; 358/468
(58) Field of Classification Search .......... 358/1.9, 358/2.1, 500, 504, 3.22–3.23, 465–468
See application file for complete search history.

(56) References Cited

U.S. PATENT DOCUMENTS

| | | | |
|---|---|---|---|
| 5,956,468 A | 9/1999 | Ancin | |
| 6,256,112 B1 | 7/2001 | Kawano | |
| 6,757,071 B1 | 6/2004 | Goodman | |
| 7,088,472 B1 | 8/2006 | Okubo | |
| 7,184,176 B2 | 2/2007 | Simpson | |
| 7,613,335 B2 * | 11/2009 | McLennan et al. | 382/128 |
| 2003/0053135 A1 | 3/2003 | Simpson | |
| 2004/0196509 A1 | 10/2004 | Cousins | |
| 2005/0259280 A1 | 11/2005 | Rozzi | |
| 2007/0019881 A1 | 1/2007 | Curtis | |
| 2008/0007785 A1 | 1/2008 | Hashii | |

FOREIGN PATENT DOCUMENTS

| | | |
|---|---|---|
| EP | 739126 | 7/2002 |
| WO | WO2007014014 | 2/2007 |

* cited by examiner

*Primary Examiner* — Thomas D Lee
*Assistant Examiner* — Stephen M Brinich
(74) *Attorney, Agent, or Firm* — Fay Sharpe LLP

(57) ABSTRACT

A system prints documents according to non-color content. The system includes a processing component that receives a print job that includes at least one of color and non-color content. A threshold selection component allows a user to select a minimum value of non-color content within the received print job. An analysis component evaluates the non-color content within each print job, compares the non-color content with the value selected via the threshold selection component, and modifies the color parameters of the print job to appear as non-color, if the threshold is met or exceeded. A print devices receives the print job information from the evaluation component and outputs the print job as a non-color print job if the non-color content threshold is met or exceeded, and outputs the print job as a color job if the non-color content threshold is not met.

19 Claims, 4 Drawing Sheets

COLOR TO BLACK ONLY PERCENT THRESHOLD OPTION FOR CUSTOMERS

BACKGROUND

Electronic documents are utilized to record, display and transfer information. Such documents can include word processing files, graphical images, spreadsheets, and electronic mail messages. In a conventional network environment, an electronic document can be printed by selecting a print driver from a list of available print drivers within an application used to generate the document. The document is then transmitted to the print device corresponding to the print driver. A digital front end (DFE) application receives and processes information from the driver to print the electronic document.

The generation of a page containing text and image data frequently starts at a terminal where a user generates a computer generated graphic or receives a contone image from a scanner. Document image and text are converted into a highly compressed form using a page description language (PDL), which is sent to a print device server, the DFE, which is usually located somewhere near the print device. The DFE decomposes the PDL and sends a number of separations of byte maps (e.g., cyan, magenta, yellow, and black) of contone video to one or more interface cards via a suitable protocol employed by the DFE. The PDL is expanded into separations of bit maps, wherein the resultant data is sent to the print device. Finally, the print device has an interface card which reformats the data into rasters, halftones them in a rendering card, and applies them to the raster output scanner (ROS) for printing.

Electronic documents can be printed either with a plurality of colors or a single color. In one example, a print job includes almost exclusively black content (e.g., text) with a small portion in color (e.g., a cut mark). Since the job contains a minimal quantity of color, it is treated as a color document. Accordingly, a plurality of colors are used to create the black text and the cut mark. Such a result is undesirable since color printing is many times more costly than printing in monochrome. This is especially true when the monochrome color is black (K).

What are needed are systems and methods to selectively force a print job to be printed in a single color when desired.

BRIEF DESCRIPTION

In one aspect, a system prints documents according to non-color content. The system includes a processing component that receives a print job that includes at least one of color and non-color content. A threshold selection component allows a user to select a minimum value of non-color content within the received print job. An analysis component evaluates the non-color content within each print job, compares the non-color content with the value selected via the threshold selection component, and modifies the color parameters of the print job to appear as non-color, if the threshold is met or exceeded. A print devices receives the print job information from the evaluation component and outputs the print job as a non-color print job if the non-color content threshold is met or exceeded, and outputs the print job as a color job if the non-color content threshold is not met.

In another aspect, a system prints documents according to non-color content. A processing component accepts a print job that contains at least one of color and non-color content. A threshold selection component allows a user to select a minimum value of non-color content within the received print job. An analysis component evaluates the non-color content within each print job, and compares the non-color content with the value selected via the threshold selection component. A billing component calculates cost as a non-color print job if the threshold is met or exceeded, and as a color print job is the threshold is not met. A print device receives the print job information from the billing component and outputs the print job based on the content determined by the analysis component regardless of whether the threshold is met.

In yet another aspect, a method allows a user to print a job based on selection of a threshold related to non-color content within a print job. A print job is submitted and a threshold is set for non-color printing. Color and non-color content contained within the print job submitted is evaluated. The print content is compared to the threshold and a determination is made whether the print job has content that is greater than the threshold. A non-color job is printed if the content is greater than the threshold. A color job is printed if the content is not greater than the threshold.

DETAILED DESCRIPTION

Figure 1:
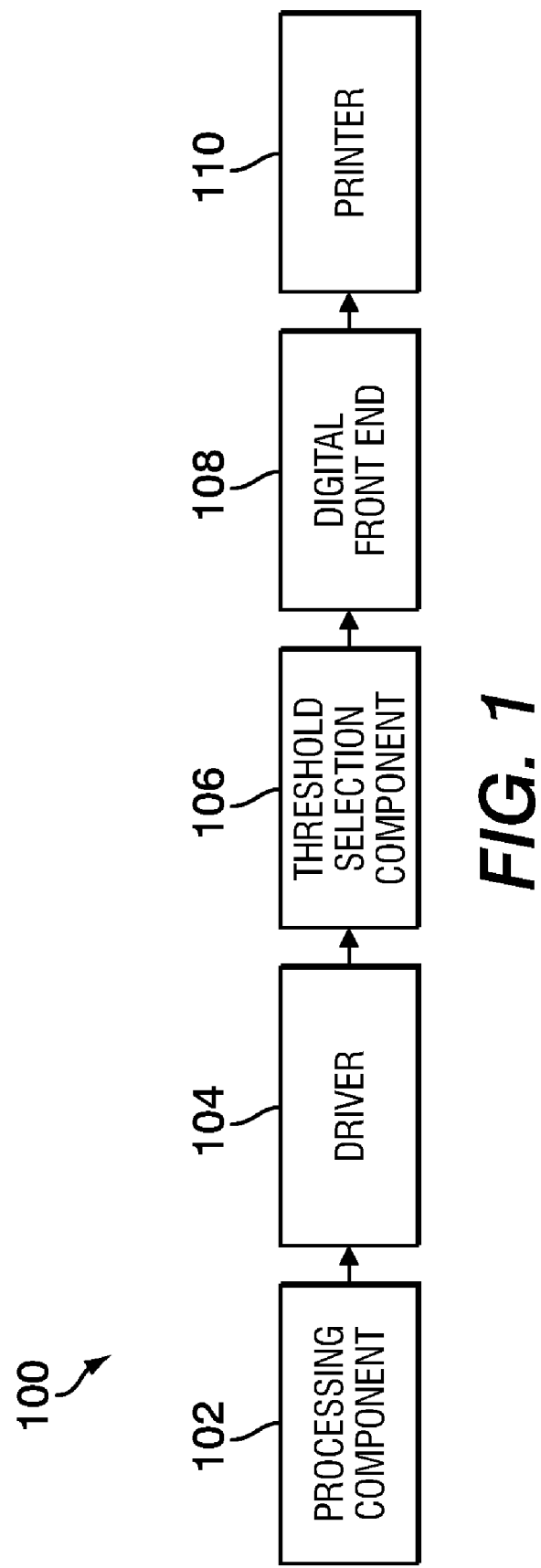
FIG. 1 is system that prints documents in view of a predefined non-color threshold, in accordance with an exemplary embodiment.

With reference to FIG. 1, a system 100 is illustrated that prints documents. A processing component 102 communicates data printed by the print device 104 via a driver 106 and a digital front end 108. A threshold selection component 110 allows a user to vary a threshold for treating a document as a monochrome black (K) document or a document that contains a plurality of disparate colors. In this manner, use of appropriate color(s) can be selected to provide associated cost savings. As utilized herein, monochrome black (K) content can also be referred to as non-color content.

The processing component 102 is employed to enter data content to be sent to the print device 104. In one embodiment, the processing component 102 is a computer that supports the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The processing component 102 can employ an exemplary environment such as a computer that includes a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer can further include a hard disk drive, a magnetic disk drive, e.g., to read from or write to a removable disk, and an optical disk drive, e.g., for reading a CD-ROM disk or to read from or write to other optical media. The computer typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM, including an operating system, one or more application programs, other program modules, and program non-interrupt data. The operating system in the computer can be any of a number of commercially available operating systems.

A user may enter commands and information into the computer through a keyboard (not shown) and a pointing device (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus ("USB"), an IR interface, etc. A monitor (e.g., the display 116), or other type of display device, is also connected to the system bus via an interface, such as a video adapter (not shown). In addition to the monitor, a computer typically includes other peripheral output devices (not shown), such as speakers, printers etc.

A display can be employed with the computer 140 to present data that is electronically received from the processing component 112. For example, the display can be an LCD, plasma, CRT, etc. monitor that presents data electronically. Alternatively or in addition, the display can present received data in a hard copy format such as a printer, facsimile, plotter etc. The display can present data in any color and can receive data from the computer 140 via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

The device driver 106 allows the processing component 102 to interface to the print device 104. In one aspect, the device driver 106 acts as a translator between the print device 104 and the applications or operating systems employed by the processing component 102. In this manner, higher-level code can be written independently of the specific model of print device 104 employed by the system 100.

The device driver 106 can convert general input/output instructions of the processing component 102 to specialized messages for consumption by the print device 104. The processing component 102 can run a software program to invoke a routine in the driver 106, wherein the driver 106 issues commands to the print device 104. Once the print device 104 sends data back to the driver, the driver may invoke routines in the original calling program. The driver 106 can also provide interrupt handling required for an asynchronous time-dependent hardware interface to the printer 110.

The communication protocols and standards of the driver 106 can vary in association with the type of print device 104 and processing component 102. In one example, each version of the print device 104 can require unique specialized commands. Software applications run by the processing component 102 can access the print device 104 by using high-level, generic commands, such as PRINTLN. The driver 106 can accept these generic statements and convert them into the low-level commands required by the print device 104.

Although the print device 104 is shown as a single component, it is to be appreciated that a plurality of print devices can be represented by the print device 104 to interface with the DFE 108. Additionally, one or more DFEs 108 can be employed to interface to the one or more print devices 104. For example, a single DFE can be employed to drive one dedicated print device. The print device 104 can be a copier, a printer, an imagesetter, a digital press, or substantially any device that creates an image on a substrate. In the case of a printer, the print device 104 can be a color laser printer, a production printer, etc.

A production printer or other high speed print device is more expensive to operate and also have a higher cost-per-page than standalone office printers. Generally, vendors assign a plurality of "click charges" to each job received, wherein the number of "click charges" increase when a color page(s) is printed within a job. In one example, a color page can have six times the number of associated "click charges" as an identical monochrome (e.g., black (K)) page.

The digital front end 108 serves as a control point to provide control over the print device 104. The digital front end 108 can be employed to recognize and assign "click charges" to print jobs as they are assigned to one or more print devices. As discussed above, the first point of control is provided through the driver 106. By making the driver 106 available at one or more locations, users can review the capabilities of the print device 104 and select desired options. For example, users can select duplex printing or collation for documents that require these features, to minimize the use of paper or manual finishing.

In order to allow high-speed printers to operate at a maximum speed, the DFE 108 organizes print data received from the processing component 102, the driver 106, and the threshold selection component 110 for consumption by the print device 104. In this manner, the DFE 108 can accommodate the complexity of page layout and leave production to the print device 104, shielding it from the page manipulation.

Data, such as a twelve page paper or a twelve page booklet, received by the print device 104 is processed in the same manner and thus can slow output speed. To relieve the print device 104 of expending data processing resources, the DFE 108 can position the pages in the booklet on appropriate sheets of paper and add a cover from a previous job. The DFE 108 is responsible for assembling necessary images and building data-driven graphics in situ so that the print device 104 receives a fully composed document. The print device 104, without the DFE 108 providing data organization and assembly, is unable to approximate printing at a maximum rated speed.

In order to match the DFE 108 with software used by the processing component 102, a common page description language (PDL) can be employed. A PDL can be created specifically to handle variable-data applications by sorting out static elements that are reused on each page from the variable images and dynamic graphics that are constantly changing. In one example, Xerox's Variable-data Intelligent PostScript Printware (VIPP) is employed.

The VIPP software can organize all the images, forms, and other page elements into a package, which is stored at the DFE 108 the first time a job is run. For each successive run of the application, only the new data or data and template need to be sent from the processing component 102 to the DFE 108. The VIPP software takes the new data and builds the new documents, re-flows text, and incorporates new data-driven graphics as needed. It is to be appreciated, however, that substantially any PDL is contemplated.

The threshold selection component 110 interfaces between driver 106 and the DFE 108 to allow a variable threshold to be set for each print job. This threshold is based on a basic dichotomy: to evaluate the ratio of black (K) content and non-black content (e.g., C, Y, and/or M). Determination of this ratio can be accomplished by analyzing substantially any aspect of the data received from the processing component. This can include analysis of each page, each color plane, reference color tables, etc. within each print job.

The threshold selection component 110 can output the color analysis information for customer billing purposes. In one example, a customer can be charged for an all black print job if a minimum threshold has been met. In this scenario, the job can be printed as color and billed as a black print job. The threshold value can be employed as a point of negotiation between a printer and customer in business agreements. Such agreements can allow a user to acquire business he/she might otherwise lose while providing acceptable price points to customers for color and non-color printing.

Alternatively, meeting the minimum black level set by the threshold selection component 110 can change one or more attributes associated with the document color content. In this approach, the threshold selection component 110 can modify all attributes that are related to color content such that they are replaced or eliminated, as appropriate, for communication to the DFE 108. The DFE 108 will provide control and forward this information to the print device 104 to be printed as a monochrome black (K) document. In this manner, a document that was created with color content (e.g., via the processing component 102) is printed as a monochrome black (K) document. This is accomplished via adjustment of only the threshold selection component 110.

The threshold selection component 110 can provide a user with any number of mechanisms to adjust a color threshold. In one embodiment, the threshold selection component 110 is an analog dial, knob, slider, etc. that can be adjusted to correlate to various incremental ratio levels of color (non-black) content within one or more print jobs. Alternatively or in addition, the threshold selection component 110 is a digital component that is adjusted via a software application and/or via one or more external signals. In this approach, the threshold selection component 110 can be a graphical icon that can be adjusted via a computer I/O device.

In particular, the threshold selection component 110 allows print jobs to be treated as black if they have at least the threshold value of black text. In one example, the threshold value is set to 70% via the threshold selection component 110 and the print job introduced contains 78% black content. In this case, the entire job is sent to the DFE 108 as 100% black.

The DFE 108 can also be selected based on various criteria such as throughput, volume of pages, print device types, etc. For example, generating thousands of pages on high-speed print devices will require disparate control from generating the same via clusters of mid-range printers. Clustering is a technique that divides a large print run across multiple print devices simultaneously to achieve very high print speeds.

In one example, the DFE 108 supports up to twelve print devices, including non-color (e.g., black (K)) and color print devices. When a non-color document is recognized, the DFE 108 assigns the job to a non-color printer. Alternatively, when a color document is recognized, the DFE 108 can add a color printer. In this manner, the DFE 108 can optimize the print resources within a system to accommodate and output both non-color and color documents.

In another example, the DFE 108 communicates with print device clusters of up to ten non-color and two color print devices. The DFE 108 can perform load balancing across the different print devices, track which print devices are idle and route work to those print devices or send copies of the same job to multiple print devices, if the job calls for more than one copy. In this manner, a print job can be completed efficiently.

The print device 104 is representative of one or more devices that can output an image onto a substrate. The print device 104 can be one or more of the printers discussed below including a toner-based printer, a liquid ink jet printer, a solid ink printer, a dye-sublimation printer and an inkless printer. In one embodiment, the print device 104 is a toner-based laser printer that utilizes Xerography to output documents. Toner is adhered to a light-sensitive print drum, wherein static electricity is employed to transfer the toner to a printing medium to which it is fused with heat and pressure. In another embodiment, the print device 104 is an LED printer which uses an array of LEDs instead of a laser to cause toner adhesion to the print drum.

The print device 104 can also be a solid ink printer that is a type of thermal transfer printer. Solid ink printers employ solid sticks of CMYK colored ink, which are melted and fed into a piezo crystal operated print-head. The printhead sprays the ink on a rotating, oil coated drum. The paper then passes over the print drum, at which time the image is transferred, or transfixed, to the page. In yet another embodiment, the print device 104 is a dye-sublimation printer that employs a printing process that uses heat to transfer dye to a medium such as a plastic card, paper or canvas. The process generally lays one color at a time using a ribbon that has color panels. Dye-sublimation printers are intended primarily for high-quality color applications, including color photography; and are less well-suited for text.

In another approach, the print device 104 is an inkless printer that uses paper with colorless dye crystals embedded between two outer layers of paper. When the printer is turned on, heat from the drum causes the crystals to colorize at different rates and become visible. Another inkless printer approach utilizes a reusable paper coated with a few micrometers of UV light sensitive chemicals. The printer employs a UV light bar that writes and erases the paper.

Figure 2:
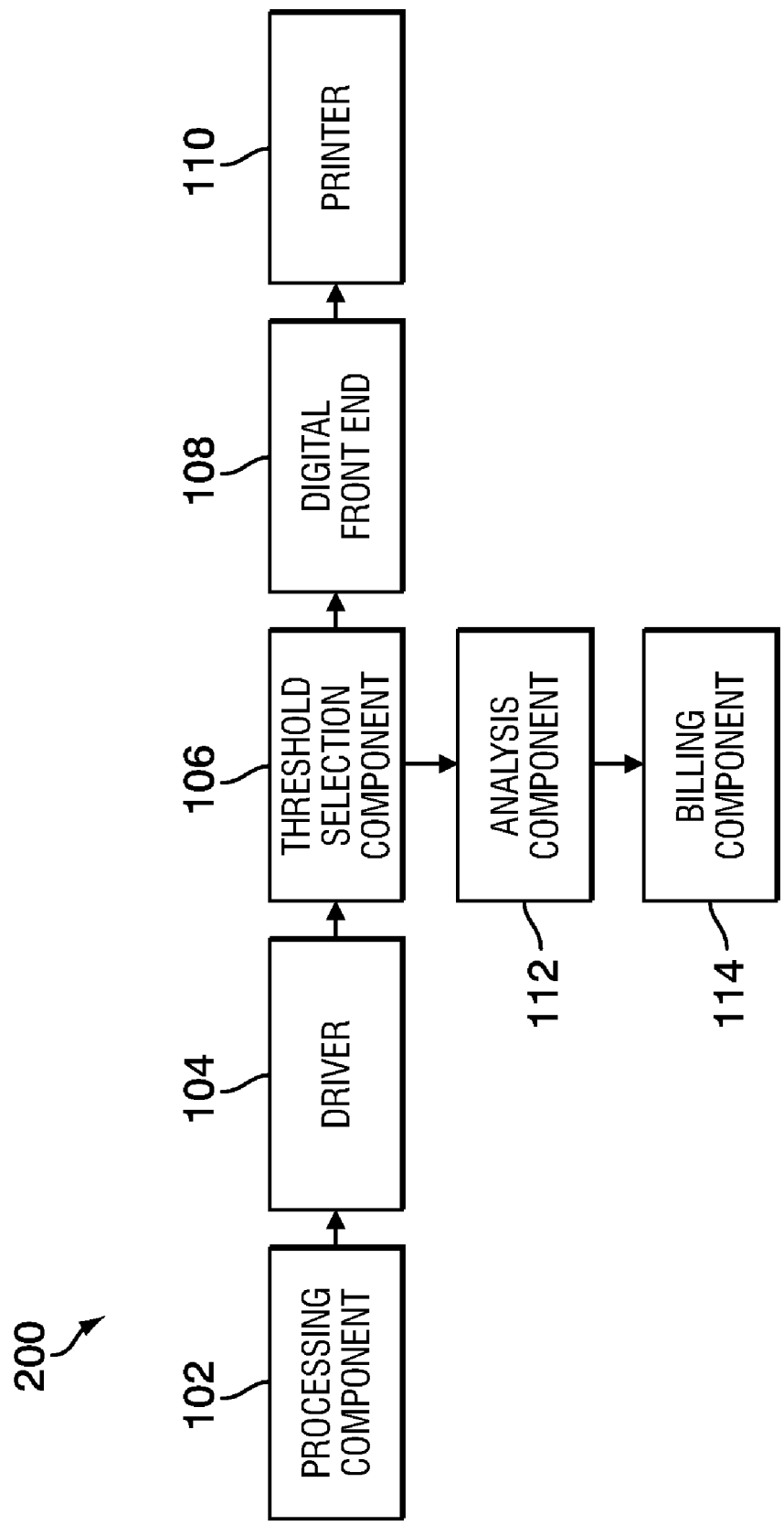
FIG. 2 is system that bills prints jobs in view of a predefined non-color threshold, in accordance with an exemplary embodiment.

FIG. 2 illustrates a system 200 that receives information to print one or more documents. The system includes the processing component 102, the printer 104, the driver 106, the DFE 108 and the threshold selection component 110 from system 100. In this embodiment, however, the threshold selection component 110 includes an analysis component 112 and a billing component 114.

The analysis component 112 reviews all the data related to a print job received by the threshold selection component 110. In particular, the analysis component 112 evaluates the document to discern the percentage of color and non-color (e.g., black (K)) content to use as a threshold. Equation 1 sets forth one exemplary formula.

$$\text{Ratio} = \text{non-color content}/\text{total content} \quad (1)$$

This ratio can include text, graphics, cut marks, photographs, etc. within a print job. Parameters can also be set to modify the breadth of data reviewed for analysis within a print job. Print job examples include a single document, a single book, a single print job, and/or a plurality of print jobs. In this manner, the threshold selection component 110 can be adjusted in reference to specific desired data sets within the system 200. One or more outputs can be set if a predetermined ratio is identified.

The billing component 114 receives information from the analysis component 112 to ascertain how print jobs are billed to each client. The billing component 114 can be adjusted when one or more outputs from the analysis component 112 are set. In one example, if a signal is received from the analysis component 112 that a threshold is met or exceed, the billing component 114 can calculate print cost as non-color documents, based on the number of documents that meet or exceed such threshold. In another example, if the analysis component 112 indicates that the document is below a predetermined ratio, the billing component can calculate print cost as color documents. In this manner, the administrator of system 200 can regulate print analysis and billing in association with agreements particularized for each customer.

Figure 3:
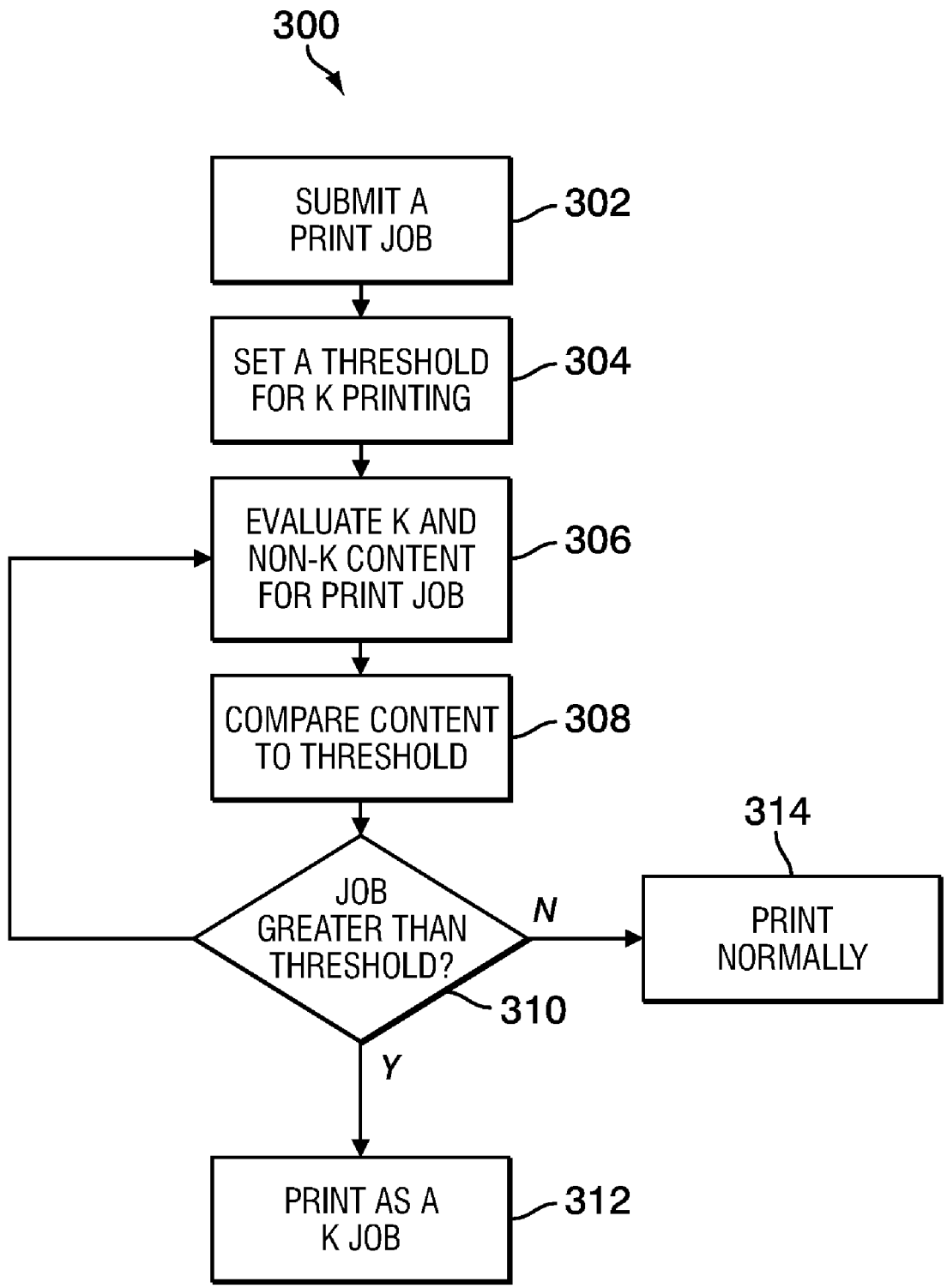
FIG. 3 is methodology to print documents in view of a predefined non-color threshold, in accordance with an exemplary embodiment.

Referring now to FIG. 3, which illustrates a methodology 300 to evaluate and print jobs in view of a predetermined non-color (K) threshold. At 302, a print job is submitted. In one approach, the print job is submitted via a processing component such as a personal computer. In another approach, the print job is submitted from a remote location to a data store for subsequent print processing. The print job can be submitted in substantially any format and via any protocol.

At reference numeral 304, a non-color (e.g., black (K)) threshold is set for the print job submitted at reference numeral 302. The threshold can be set based on any number of metrics. In one example, a threshold is selected based on the ratio of non-color content contained in a particular data set. Such data set can be associated with a book, an entire print job, a page, etc. In another example, the threshold can be a raw numerical value associated with non-color or color content such as pixels, planes, etc. The threshold can be adjusted via any analog or digital knob, switch, icon, graphic, etc. At 306, the document is evaluated in view of the data set selected at 304.

At 308, the content evaluated at 306 of the data set is compared to the threshold selected at 304. At 310, a determination is made as to whether the print job is greater than the threshold selected at 304. At 312, if the content is equal to or greater than the threshold, the data is printed as a non-color print job. A DFE or equivalent hardware utilizes resources within a print system to direct the job to one or more appropriate printers. At 314, if the content is less than the threshold, the data is printed as a color print job. Again, a DFE or equivalent hardware utilizes resources within a print system to direct the job to one or more appropriate printers. The method then cycles back to step 306 to evaluate content as each print job is received.

Figure 4:
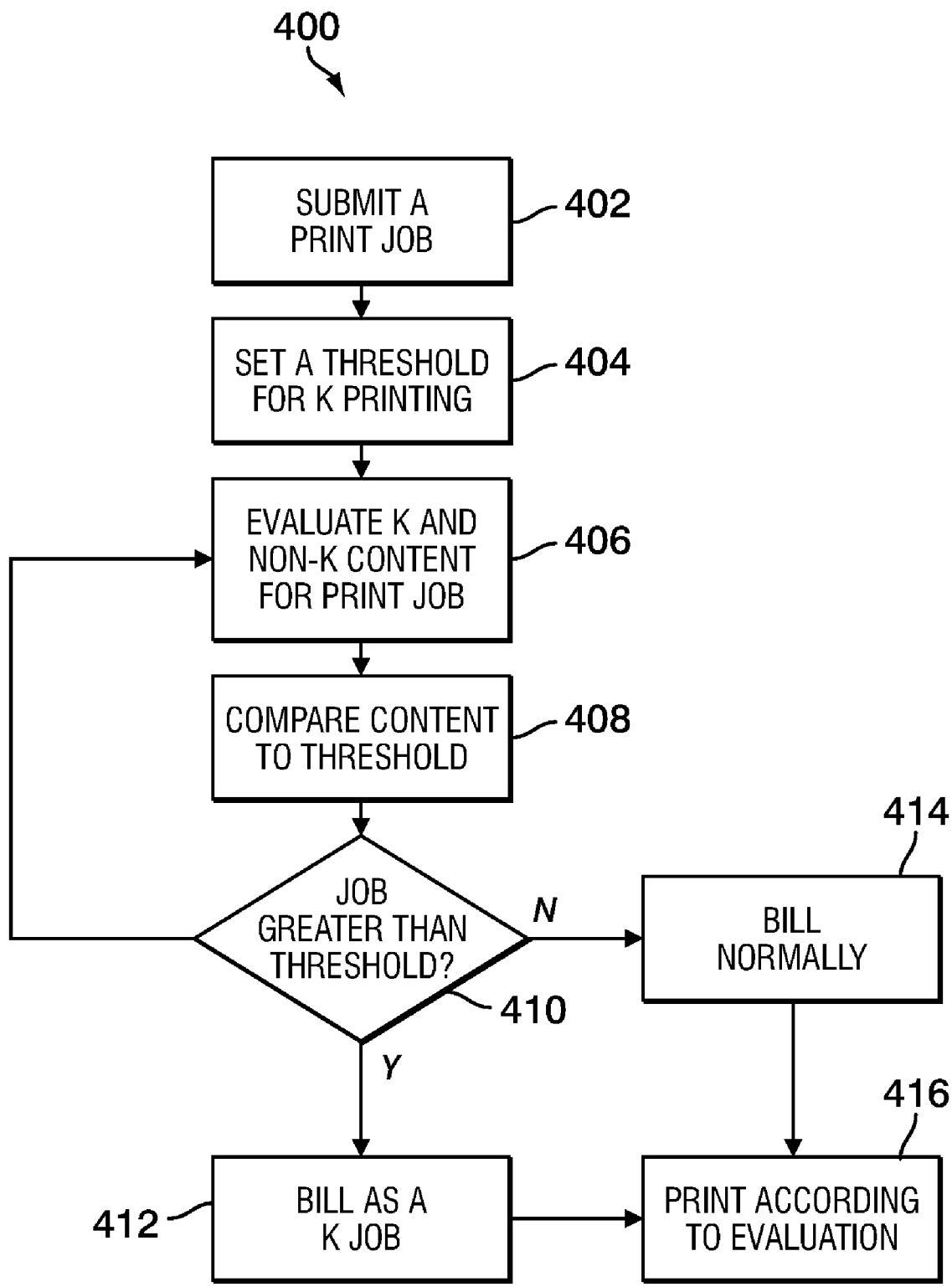
FIG. 4 is system to bill print jobs in view of a predefined non-color threshold, in accordance with an exemplary embodiment.

Referring now to FIG. 4, which illustrates a methodology 400 to evaluate and print jobs in view of a predetermined non-color (K) threshold. At 402, a print job is submitted. In one approach, the print job is submitted via a processing component such as a personal computer. In another approach, the print job is submitted from a remote location to a data store for subsequent print processing. The print job can be submitted in substantially any format and via any protocol.

At reference numeral 404, a non-color (e.g., black (K)) threshold is set for the print job submitted at reference numeral 402. The threshold can be set based on any number of metrics. In one example, a threshold is selected based on the ratio of non-color content contained in a particular data set. Such data set can be associated with a book, an entire print job, a page, etc. In another example, the threshold can be a raw numerical value associated with non-color or color content such as pixels, planes, etc. The threshold can be adjusted via any analog or digital knob, switch, icon, graphic, etc. At 406, the document is evaluated in view of the data set selected at 404.

At 408, the content evaluated at 406 of the data set is compared to the threshold selected at 404. At 410, a determination is made as to whether the print job is greater than the threshold selected at 404. At 412, if the content is equal to or greater than the threshold, the print job is billed as a non-color print job. A DFE or equivalent hardware utilizes resources within a print system to direct the job to one or more appropriate printers. At 414, if the content is less than the threshold, the print job is billed as a color print job. Again, a DFE or equivalent hardware utilizes resources within a print system to direct the job to one or more appropriate printers. At 416, the content is printed based on the parameters of the print job submitted regardless of threshold value.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system that prints documents according to non-color content, comprising:
   a processing component that receives a print job that contains at least one of color and non-color content;
   a threshold selection component that receives a user-selection for a minimum value of non-color content within the received print job;
   an analysis component adapted to:
      determine a ratio of non-color content to total content,
      compare the ratio to the minimum value,
      in response to the ratio exceeding the minimum value, provide a modified print job by converting the color content to non-color content, and
      calculate a print cost of the modified print job as a non-color print job; and
   a print device that outputs the modified print job as the non-color job.

2. The system according to claim 1 wherein the minimum value is based on a ratio of color and non-color content.

3. The system according to claim 1 wherein the minimum value is based on at least one of a page, a book, a customer, a document, a print job, and/or a plurality of print jobs.

4. The system according to claim 1 further including:
   a print driver to facilitate communication between the processing component and the printer.

5. The system according to claim 1 wherein the analysis component reviews one or more of a text, a graphic, a photograph, a cut mark, and a color plane.

6. The system according to claim 1, wherein the threshold selection component includes a first adjustment element that is at least one of a dial, a knob, a slider, a graphic, an icon to allow a user to select a minimum value of non-color content within the received print job.

7. The system according to claim 6, wherein the threshold selection component includes a second adjustment element that is at least one of a one of a dial, a knob, a slider, a graphic, an icon to allow a user to vary the data over which the minimum value is calculated.

8. The system according to claim 1 wherein non-color is black.

9. The system according to claim 1 wherein color is at least one of a cyan, a magenta, a yellow, a red, a green, a blue, and a white.

10. The system according to claim 1 further including:
    a billing component that bills each print job based on the comparison to the threshold level.

11. The system according to claim 1 further including:
    a digital front end that receives the print job data from the threshold selection component and transmits the print job data to one or more print devices based at least in part on the non-color content of the print job.

12. The system according to claim 1 wherein the print device is one or more of an imagesetter, a digital press, and a printer.

13. A system that prints documents according to non-color content, comprising:
    a processing component that accepts a print job that contains at least one of color and non-color content;
    a threshold selection component that that receives a user-selection for a minimum value of non-color content within the received print job;
    an analysis component that evaluates the non-color content within each print job, the analysis component adapted to:
       determine a ratio of non-color content to total content, and
       compare the ratio to the threshold;
    a billing component that calculates a print cost of the print job as a non-color print job in response to the ratio exceeding the threshold; and
    a print device that receives the print job information from the billing component and outputs the print job including color.

14. The system according to claim 13 wherein the print device is at least one of a toner based printer, a liquid ink jet printer, a solid ink printer, a dye-sublimation printer, and an inkless printer.

15. The system according to claim 13, wherein the minimum value is based on at least one of a page, a book, a customer, a document, a print job, and/or a plurality of print jobs.

16. The system according to claim 15 further including:
    a print driver to facilitate communication between the processing component and the printer.

17. The system according to claim 13 wherein the analysis component reviews one or more of a text, a graphic, a photograph, a cut mark, and a color plane.

18. The system according to claim 15 further including:
    a digital front end that receives the print job data from the threshold selection component and transmits the print job data to one or more print devices based at least in part on the non-color content of the print job.

19. A method that allows a user to print a job based on selection of a threshold related to non-color content within a print job, comprising:
    receiving a selection for a printing parameter;
    receiving a submission for a print job;
    receiving a selection for a threshold for non-color printing;
    evaluating color and non-color content contained within the print job submitted, the evaluating including determining a ratio of non-color content to total content;
    comparing the ratio to the threshold; and,
    in response to the ratio meeting the threshold,
    adjusting a billing of the color job by calculating the billing as a non-color job; and,
    printing the print job in one of color and non-color based on the received parameter.

* * * * *